United States Patent
Schatz et al.

(10) Patent No.: US 8,915,292 B2
(45) Date of Patent: Dec. 23, 2014

(54) EXHAUST GAS HEAT EXCHANGER AND METHOD OF OPERATING THE SAME

(75) Inventors: Harald Schatz, Reutlingen (DE); Michael Daniel, Neuhausen (DE); Thomas Grotophorst, Oak Creek, WI (US); Jeff Schernecker, Racine, WI (US); Daniel E. Hornback, Davisburg, MI (US); Andrew Boyer, Cudahy, WI (US)

(73) Assignee: Modine Manufacturing Company, Racine, WI (US)

( * ) Notice: Subject to any disclaimer, the term of this patent is extended or adjusted under 35 U.S.C. 154(b) by 684 days.

(21) Appl. No.: 13/215,333

(22) Filed: Aug. 23, 2011

(65) Prior Publication Data

US 2012/0043063 A1 Feb. 23, 2012

Related U.S. Application Data

(63) Continuation-in-part of application No. 11/702,755, filed on Feb. 6, 2007, now Pat. No. 8,020,610.

(30) Foreign Application Priority Data

Feb. 7, 2006 (DE) .......................... 10 2006 005 362

(51) Int. Cl.
| | | |
|---|---|---|
| *F28D 7/16* | (2006.01) | |
| *F28F 3/06* | (2006.01) | |
| *F28D 9/00* | (2006.01) | |
| *F02M 25/07* | (2006.01) | |
| *F28F 3/02* | (2006.01) | |
| *F28D 21/00* | (2006.01) | |
| *F28F 9/00* | (2006.01) | |
| *F28F 21/08* | (2006.01) | |

(52) U.S. Cl.
CPC ......... *F28D 9/0031* (2013.01); *F02M 25/0737* (2013.01); *F28F 3/025* (2013.01); *F02M 25/0714* (2013.01); *F28D 21/0003* (2013.01); *F28F 9/00* (2013.01); *F28F 21/08* (2013.01); *F28F 2210/10* (2013.01); *Y02T 10/121* (2013.01); *F28F 2265/26* (2013.01)
USPC ................ 165/81; 165/82; 165/157; 165/166

(58) Field of Classification Search
CPC ...... F28F 9/0239; F28F 9/0241; F28F 9/0236
USPC ...................... 165/81, 82, 157, 166
See application file for complete search history.

(56) References Cited

U.S. PATENT DOCUMENTS

| 1,790,241 A | * | 1/1931 | Murray, Jr. et al. ............. 165/81 |
| 1,790,535 A | * | 1/1931 | Coe ................................ 165/81 |

(Continued)

FOREIGN PATENT DOCUMENTS

| DE | 10349150 | 5/2005 |
| DE | 102004050567 | 6/2005 |

(Continued)

*Primary Examiner* — Leonard R Leo
(74) *Attorney, Agent, or Firm* — Michael Best & Friedrich LLP (57) ABSTRACT

An exhaust gas heat exchanger that includes a stack at least partially surrounded by a housing. The stack includes a first tube, a second tube, and a coolant duct between the first tube and the second tube. A fin is located within the coolant duct. The fin includes a first portion and a second portion and the first tube includes a first portion and a second portion. The first portion of the fin is fixed to the first portion of the first tube such that the first portion of the fin is coupled to the first portion of the first tube for movement with respect to the housing, and the second portion of the fin is supported in the housing for movement relative to the second portion of the first tube to permit movement of the second portion of the first tube with respect to the second portion of the fin.

12 Claims, 11 Drawing Sheets

(56) References Cited

U.S. PATENT DOCUMENTS

| | | | |
|---|---|---|---|
| 1,903,125 A * | 3/1933 | Modine | 165/81 |
| 2,488,807 A | 11/1949 | Currie | |
| 2,680,600 A | 6/1954 | Rothemund | |
| 2,990,163 A | 6/1961 | Farrell | |
| 3,291,206 A | 12/1966 | Nicholson | |
| 3,313,344 A * | 4/1967 | Hayden | 165/166 |
| 3,734,135 A | 5/1973 | Mosier | |
| 3,893,509 A | 7/1975 | Satchwell et al. | |
| 5,209,289 A | 5/1993 | Haushalter | |
| 6,293,338 B1 | 9/2001 | Chapman et al. | |
| 6,357,396 B1 | 3/2002 | Stansfield et al. | |
| 6,530,425 B2 | 3/2003 | Wehrmann et al. | |
| 6,935,416 B1 * | 8/2005 | Tsunoda et al. | 165/166 |
| 2002/0153129 A1 | 10/2002 | White et al. | |
| 2004/0226694 A1 | 11/2004 | Dilley et al. | |
| 2007/0017661 A1 | 1/2007 | Geskes et al. | |
| 2007/0181294 A1 | 8/2007 | Soldner et al. | |

FOREIGN PATENT DOCUMENTS

| | | |
|---|---|---|
| EP | 1348924 | 1/2003 |
| EP | 1541954 | 6/2005 |
| WO | 03036214 | 5/2003 |
| WO | 03064953 | 8/2003 |
| WO | 03091650 | 11/2003 |

* cited by examiner

EXHAUST GAS HEAT EXCHANGER AND METHOD OF OPERATING THE SAME

CROSS-REFERENCE TO RELATED APPLICATIONS

This application is a continuation-in-part of U.S. patent application Ser. No. 11/702,755, filed Feb. 6, 2007, which claims priority to German Patent Application No. DE 10 2006 005 362.1, filed Feb. 7, 2006, the entire contents of both of which are incorporated herein by reference.

BACKGROUND

The present invention relates to an exhaust gas heat exchanger in an exhaust gas recirculation arrangement.

SUMMARY

European Patent No. 1 348 924 A2 discloses a gas heat exchanger. However, the exhaust gas temperatures of motor vehicle engines, and accordingly, also the temperature differences between the coolant and the exhaust gas are increasing. This causes fracturing and similar damage caused by excessively high temperature stresses and can result in the failure of the entire system.

Work has already been carried out on improving exhaust gas heat exchangers in terms of their resistance to changing temperature stresses. PCT Application No. WO 03/036214A1 discloses a system having slits and a folding bellows arranged in a housing, as a result of which the expansion characteristics of the individual parts of the exhaust gas heat exchanger can certainly be improved. PCT Application No. WO 03/064953 discloses merely one or more expansion beads in the housing casing. PCT Application No. WO 2003/091650 discloses a sliding seat arrangement.

Because the flow directing elements of the present invention are constructed as a corrugated plate in which ducts with inlets and outlets extend in a longitudinal direction, or alternatively, in a transverse direction, with at least some of the ducts having a bent profile at least in the inlet area of the coolant, the flow speed of the entering coolant is selectively increased and the flow is deflected or distributed over as much of the area of the plate as possible. As a result, the temperature differences can be selectively lowered.

Some embodiments of the present invention are particularly effective when the inlet for the coolant is located in the vicinity of the inlet for the exhaust gas so that the exhaust gas heat exchanger can have a parallel flow. The inventors have found that parallel flow through the heat exchanger is more favorable in terms of reducing temperature stresses. The inclusion of a bend in the duct adjacent to the inlet ensures that there is a high flow speed of the coolant, which also prevents the liquid coolant from changing into a gaseous state.

In exhaust gas heat exchangers with ducts which are oriented in the longitudinal direction of the corrugated plate, the corrugated plate can be configured at the two longitudinal edges in such a way that the coolant is prevented from flowing between the edges of the plate and the housing. This contributes to concentrating the flow on the areas in the ducts which are configured for heat exchange.

In some embodiments, the structural complexity of the present invention remains at an acceptable level if the longitudinal edges of the plate are bent over and bear against the adjoining flat tube and are connected (e.g., soldered) thereto. In other embodiments, other connecting technologies and techniques can also or alternatively be used, such as, for example, brazing and welding.

The corrugated plate can have planar edges in the inlet area to support the aforementioned distribution of coolant.

Adjacent to the inlet area, the ducts can have a generally straight design, and in one exemplary embodiment, the ducts can extend in the longitudinal direction of the exhaust gas heat exchanger. In other embodiments, the ducts are oriented essentially in the transverse direction of the exhaust gas heat exchanger.

Some embodiments of the present invention provide an exhaust gas heat exchanger that includes a housing having an exhaust gas inlet, an exhaust gas outlet, a coolant inlet, and a coolant outlet. The exhaust gas heat exchanger further includes a stack at least partially surrounded by the housing, and the stack includes a first tube defining a first exhaust gas flow path, a second tube defining a second exhaust gas flow path, a coolant duct between the first tube and the second tube and the coolant duct defining a coolant flow path between the coolant inlet and the coolant outlet, and a fin located within the coolant duct between the first tube and the second tube. The fin includes a first portion and a second portion defined along a length of the fin measured in a flow direction of the coolant flow path. The first tube includes a first portion and a second portion defined along a length of the first tube measured in a flow direction of the first exhaust gas flow path. The first portion of the fin is fixed to the first portion of the first tube such that the first portion of the fin is coupled to the first portion of the first tube for movement with respect to the housing, and the second portion of the fin is supported in the housing for movement relative to the second portion of the first tube to permit movement of the second portion of the first tube with respect to the second portion of the fin.

Some embodiments of the present invention provide an exhaust gas heat exchanger in an exhaust gas recirculation arrangement. The heat exchanger includes a housing and a stack at least partially surrounded by the housing. The stack includes flat tubes containing a turbulator through which exhaust gas flows, and a coolant duct has a flow directing element arranged between two of the flat tubes and formed from a corrugated plate. The corrugated plate includes a nonlinear corrugation having bent walls that define a duct in the coolant duct. The duct has an inlet and an outlet. The corrugation is nonlinear and has bent walls so that the duct includes a nonlinear profile between the inlet and the outlet and the duct defines a first path segment extending in a transverse direction of the heat exchanger and a second path segment extending in a longitudinal direction of the heat exchanger. Changes in length are permitted between the stack and the housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The integration of the exhaust gas heat exchanger into an exhaust gas recirculation arrangement has not been shown in prior devices. In the illustrated embodiment of FIGS. 1-12, plates have been used. In each embodiment, two plates form one flat tube. In contrast, FIGS. 13-17 illustrate embodiments in which the flat tubes have been formed in one piece and welded with a longitudinal seam.

A plate stack 4 of the exhaust gas heat exchanger of the present invention can be formed from a number of pairs of plates 1 which are connected at their longitudinal edges 10 to form a flat tube 2. Each flat tube 2 can include a turbulator 3 through which exhaust gas flows. In each case, the plate stack 4 includes a coolant duct 5, which is equipped with fins or flow directing elements 6, is arranged between two flat tubes 2. The portion of the plate stack 4 illustrated in FIG. 3 includes a first tube 2 made from a first pair of plates 1 surrounding a turbulator 3, a second tube 2 made from a second pair of plates 1 surrounding a turbulator 3 and a flow directing element 6 between the first and second tubes 2. In some embodiments, the plate stack 4 omits one or more of the turbulators 3. In some embodiments, each of the aforementioned components is manufactured from stainless steel sheets. In other embodiments, less than all of the aforementioned components can be manufactured from stainless steel sheets. In still other embodiments, other materials, including composites and alloys, can also or alternatively be used.

In the illustrated embodiment, the flow directing elements 6 are formed from a corrugated plate 7. Ducts 13 with inlets and outlets 14, 15 are formed in the corrugated plate 7. At least some of the ducts 13 in the coolant inlet area 16 can have a bent or nonlinear profile which divides or distributes the flow. The corrugated plates 7 can have bent-over longitudinal edges 17 which can each engage, at its longitudinal edges, the flat tube 2 which is arranged above it (see FIG. 3). In contrast, in the inlet area 16, planar edges have been provided on the flow elements 6.

Figure 1:
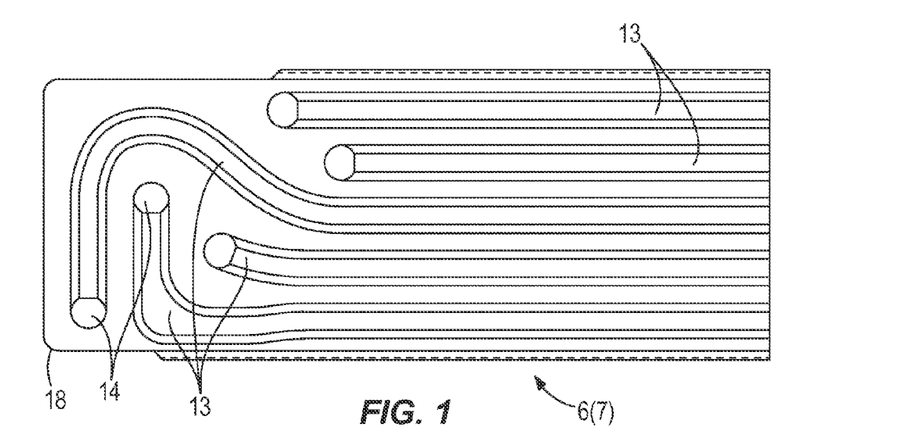
FIG. 1 is a plan view of a flow directing element of the present invention.
Figure 2:
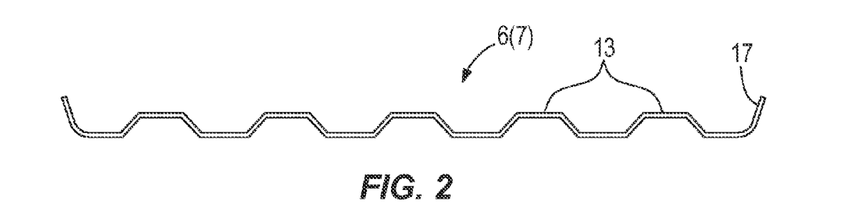
FIG. 2 is a sectional view of a portion of the flow directing element shown in FIG. 1.
Figure 4:
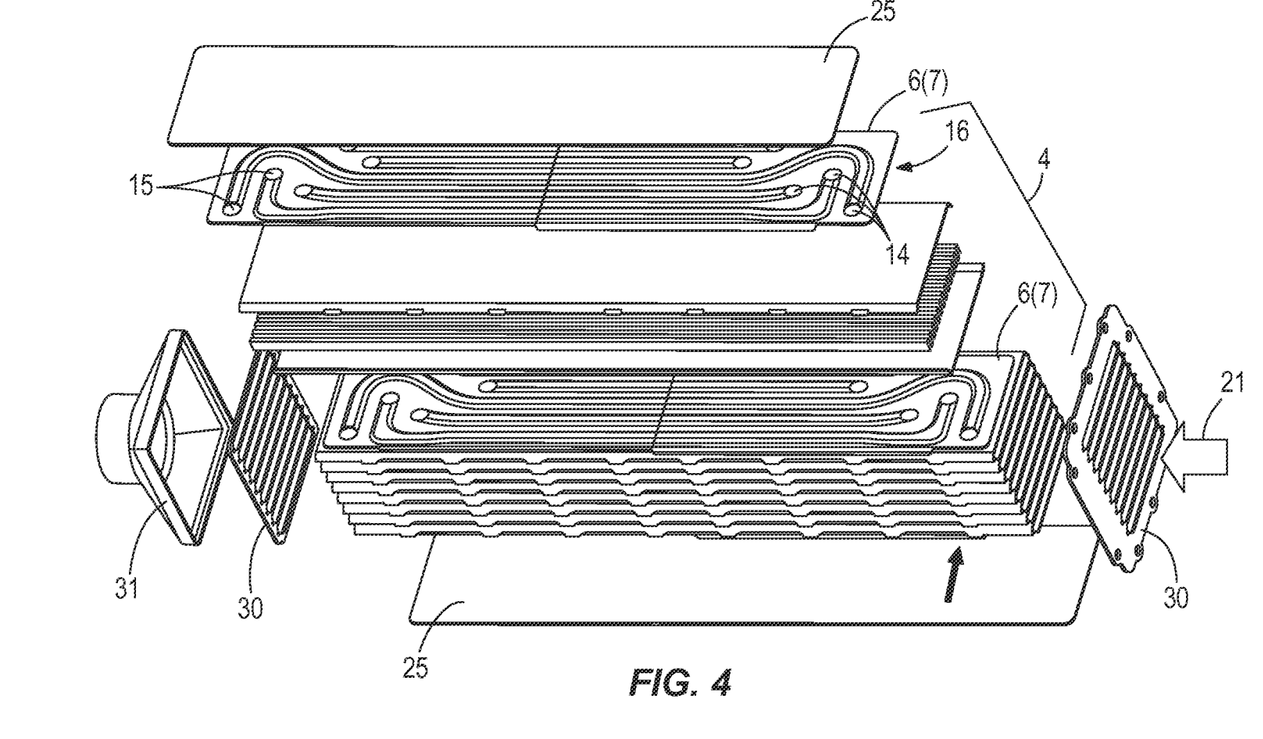
FIG. 4 is an exploded view of the stack shown in FIG. 3.
Figure 5:
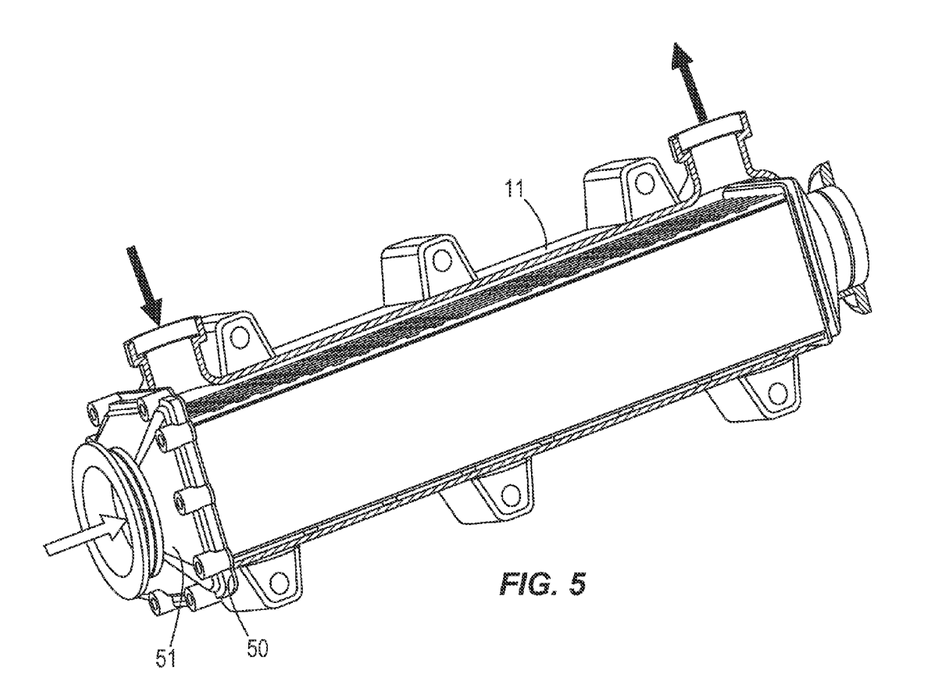
FIG. 5 is a sectional view of the stack shown in FIG. 3 supported in a housing.
Figure 6:
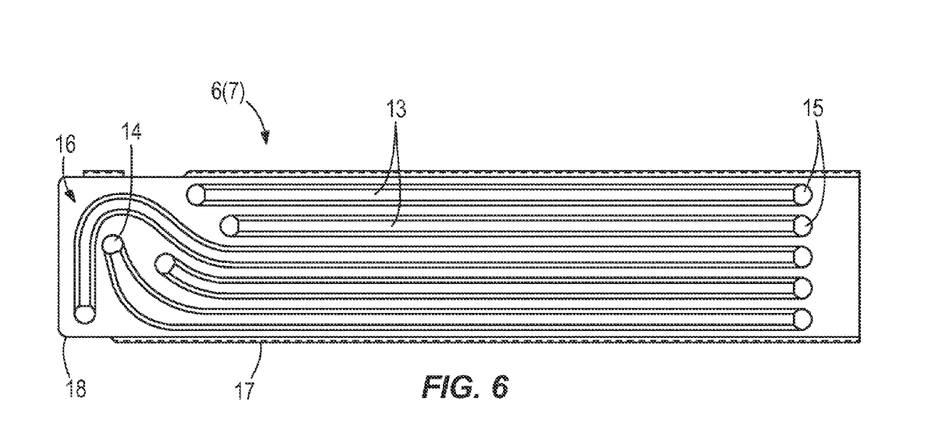
FIG. 6 is a plan view of a flow directing element according to another embodiment of the present invention.
Figure 7:
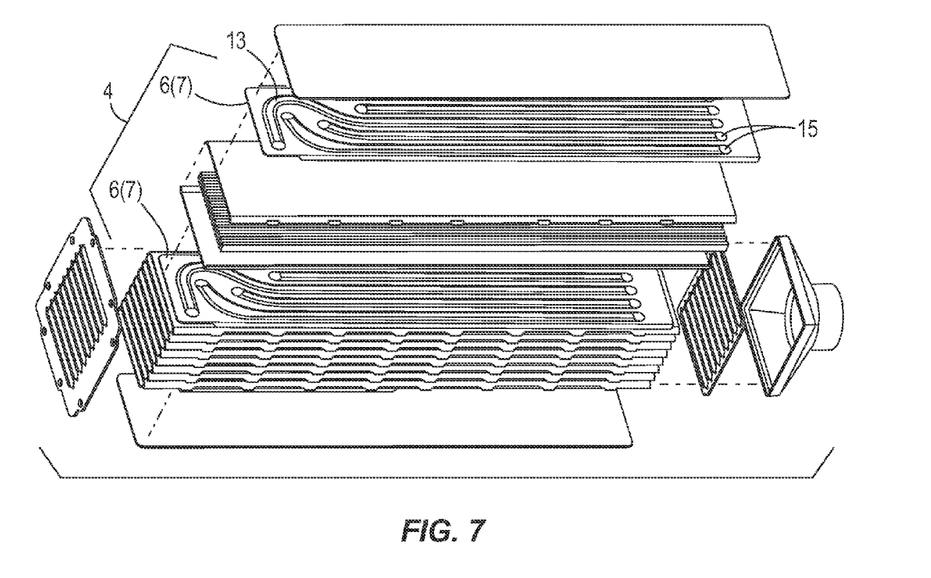
FIG. 7 is an exploded view of the stack shown in FIG. 6.

The aforementioned components are assembled according to FIG. 4 or 7 to form the plate stack 4. The two figures differ from one another in that in FIG. 4 two-part flow directing elements 6 have each been arranged in a coolant duct 5, and in FIG. 7 the flow directing element 6 is in one piece. In FIG. 1, one of the two-part flow directing elements 6 is shown, and in FIG. 6 the one-piece flow directing element 6 has been illustrated.

A tube plate 30, which can also or alternatively be manufactured from stainless steel, and a header or a diffuser 31 are fitted onto the two ends of the plate stack 4. The plate stack 4 is also closed off at the top and bottom ends by two side parts 25, which can also or alternatively be formed from stainless steel.

Figure 14:
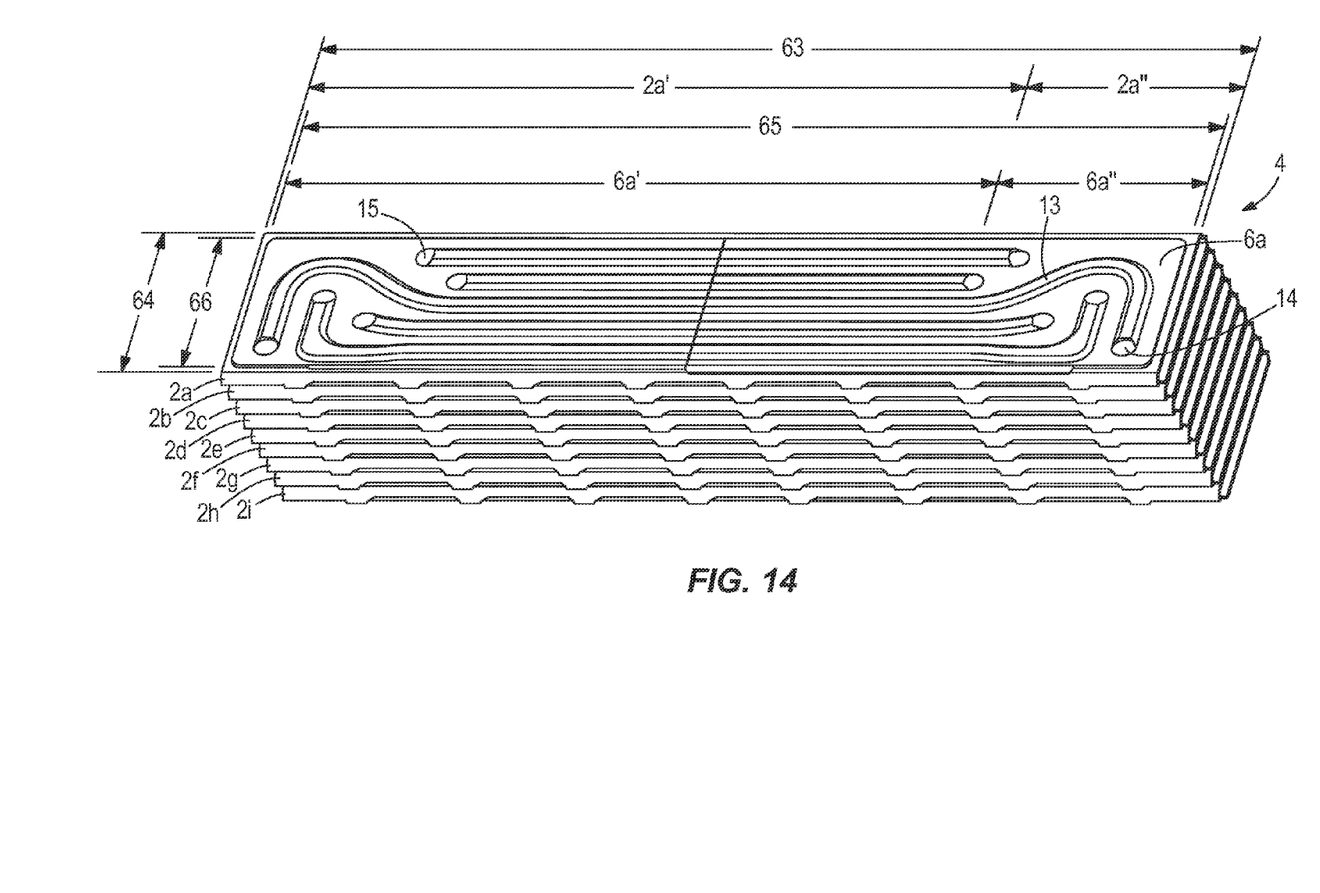
FIG. 14 is a perspective view of a stack according to an embodiment of the present invention.

The described plate stack 4 structure is initially soldered, with all the parts which are shown in FIG. 4, 7 or 14. Then, in a further step, a seal 40 is fitted around the circumference of the plate stack 4. The seal 40 can ensure that the coolant is concentrated in the coolant ducts 5. The coolant can be prevented from flowing between the housing 11 and the circumference of the plate stack 4. This effect is enhanced by the described special structure of the longitudinal edges 17 on the corrugated plate 7. In a further step, the prefabricated unit of the plate stack 4 is inserted into the housing 11, (described in more detail below) in such a way that changes in length which occur due to changing temperature stresses can be compensated for.

Figure 10:
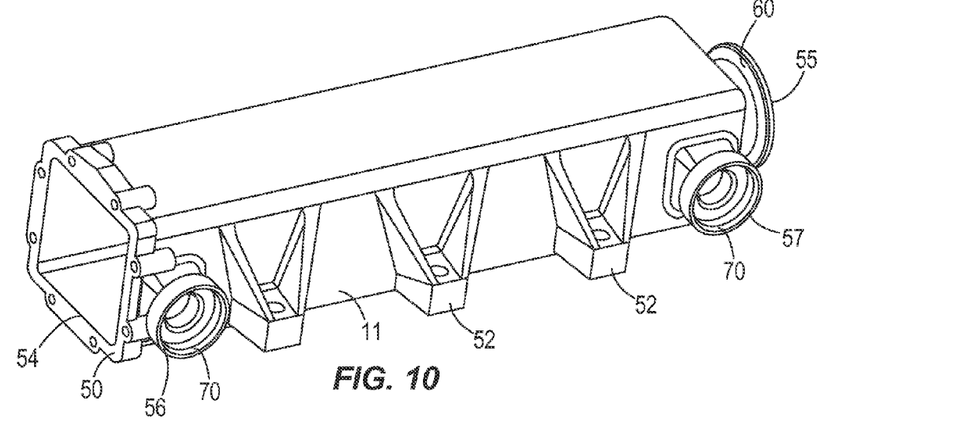
FIG. 10 is a perspective view of a housing of the exhaust gas heat exchanger shown in FIG. 9.

The housing 11 which has just been mentioned can be a die cast structure and can be made of aluminum (see FIG. 10). The housing 11 includes an exhaust gas inlet 54, an exhaust gas outlet 55, a coolant inlet 56, and a coolant outlet 57. The housing 11 can have a tapered outlet flange 60 adjacent the exhaust gas outlet 55 for the exhaust gas which is dimensioned in such a way that the diffuser 31 which can be soldered to the plate stack 4 fits into it. In addition, a groove 61 can be shaped to receive a sealing ring or another suitable seal 62 (see FIG. 9). From this illustration, it is clear that changes in length caused by changes in temperature can be compensated for by allowing movements in the longitudinal direction of the plate stack 4 or of the housing 11. The two double block arrows on the left hand side in FIG. 9 indicate this.

The flow directing elements 6 additionally reduce the stresses or changes in shape caused by changing temperature stresses. At the other end of the housing 11 adjacent the exhaust gas inlet 54, a further flange 50, to which the tube plate 30 of the plate stack 4 and a further exhaust gas header 51 are formed. In addition, connectors 52 are formed on the housing 11 in order to be able to attach the exhaust gas heat exchanger to a connecting structure (not shown). Finally, connectors 70 have been formed on the housing 11 adjacent the coolant inlet 56 and the coolant outlet 57 in order to allow the coolant to flow in and out of the coolant ducts 5 of the plate stack 4. Fluid flow in and out is ensured by the edges 18—not shaped in the inlet area 16 or in the outlet area—on the flow directing elements 6 which are arranged in substantially all of the coolant ducts 5.

Figure 8:
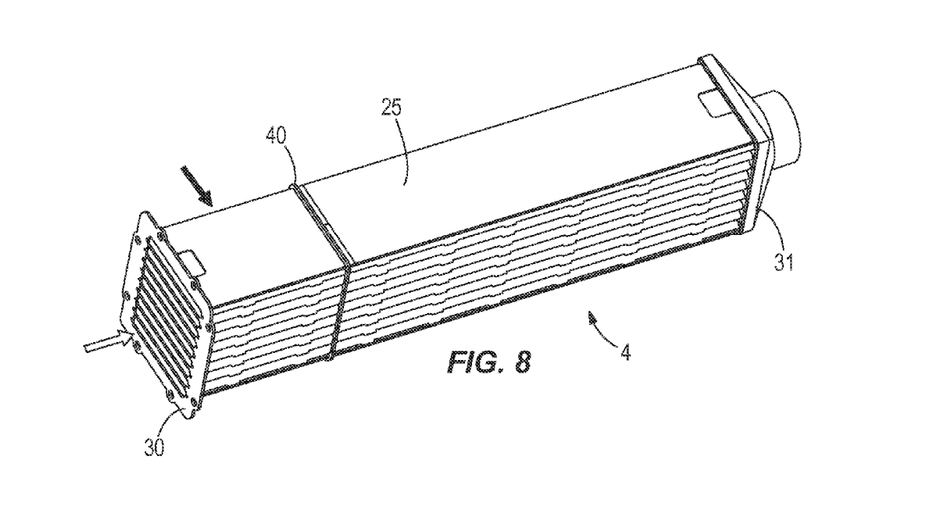
FIG. 8 is a view of a soldered stack.
Figure 9:
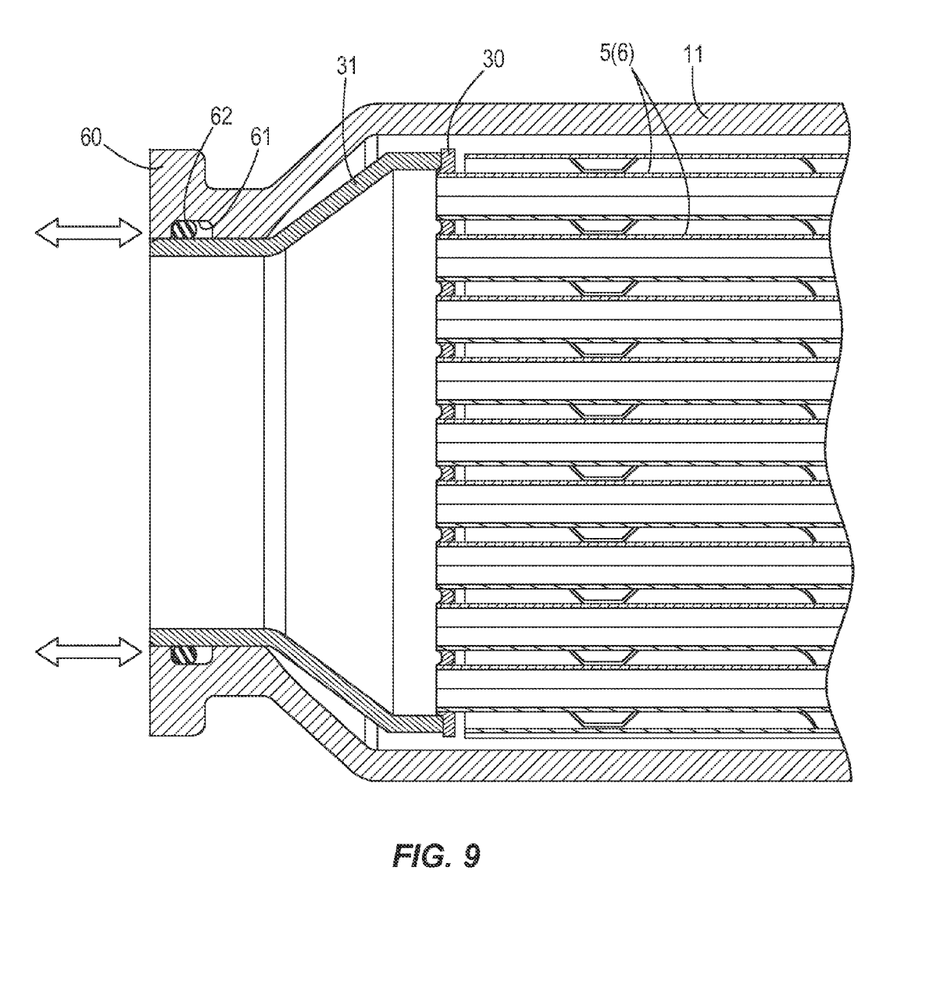
FIG. 9 is a partial longitudinal sectional view taken through an exhaust gas heat exchanger.
Figure 11:
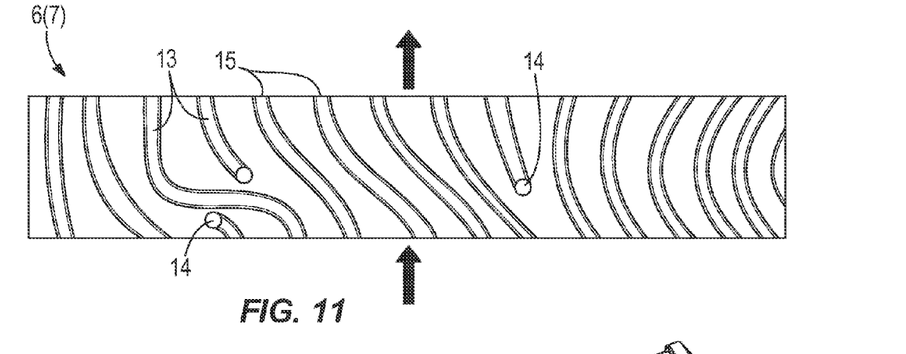
FIG. 11 is a plan view of a flow directing element according to yet another embodiment of the present invention.
Figure 12:
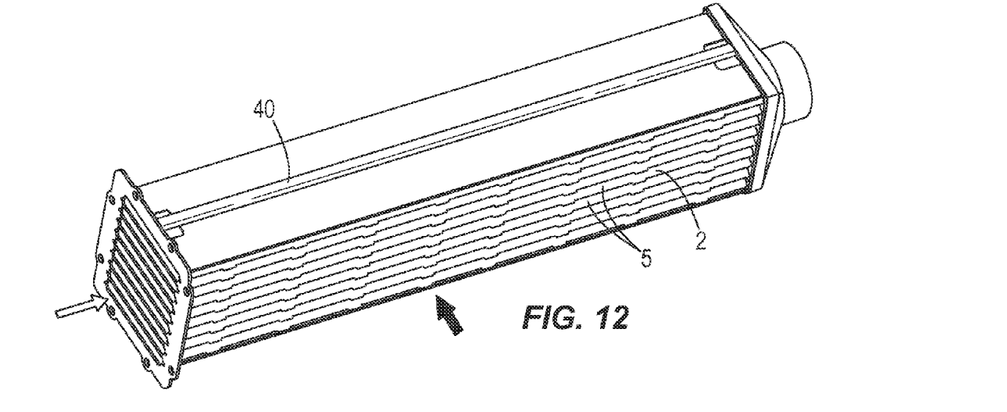
FIG. 12 is a view of a soldered stack.

FIGS. 11 and 12 refer to an exemplary embodiment with ducts 13 which extend in the transverse direction of the exhaust gas heat exchanger and are formed in the flow directing element 6. FIG. 11 shows a plan view of such a flow directing element 6. The black block arrows show again the direction of the coolant. Some of the ducts 13 have inlets 14 or outlets 15 within the corrugated plate 6. In the majority of the ducts 13, the inlets or outlets have been arranged on the two longitudinal edges of the corrugated plate 6. FIG. 12 shows an illustration of the soldered exhaust gas heat exchanger which has external similarities to that shown in FIG. 8. However, in that figure, the flow directing elements 6 from FIG. 11 have not been used. The housing which is arranged around this stack has been correspondingly modified. It has not been shown for this individual case. In the figure, the arrows also show the direction of flow through the coolant and the exhaust gas. A visible difference from FIG. 8 is that the seal 40 extends in the longitudinal direction of the exhaust gas heat exchanger. Here too, the seal 40, which is intended to bear against the housing wall (not shown), ensures that the cooling liquid is concentrated on the coolant ducts 5.

Figure 3:
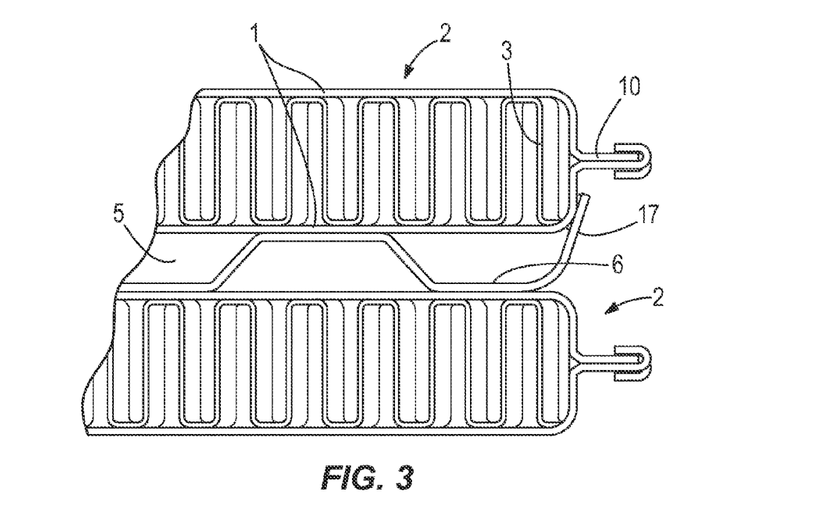
FIG. 3 is an enlarged end view of a portion of a stack according to the present invention.
Figure 13:
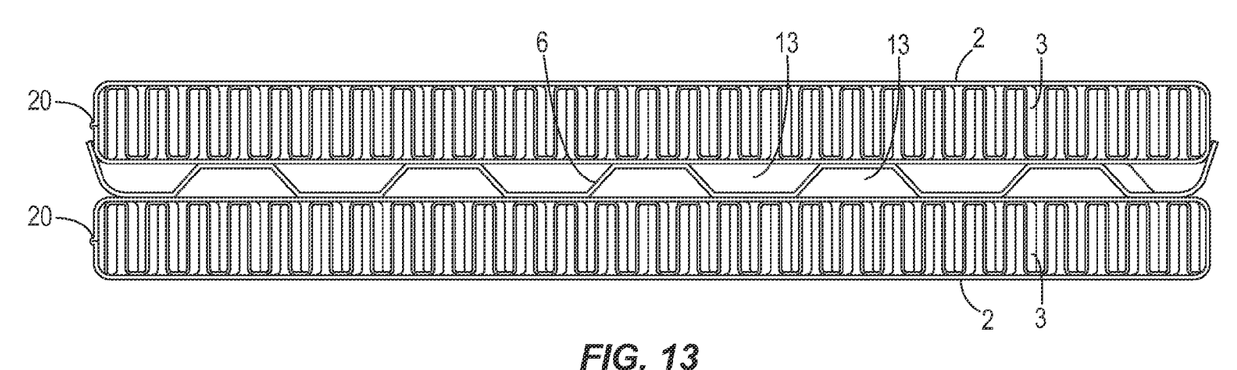
FIG. 13 is an enlarged view of a stack.

FIG. 13 illustrates a stack which is similar to FIG. 3. Flat tubes 2 which are formed from a strip of sheet steel and are welded together along a longitudinal seam 20 are formed together into a stack.

FIG. 14 illustrates a plate stack 4 for an exhaust gas heat exchanger according to another embodiment. The plate stack 4 of FIG. 14 includes components and features similar to the plate stacks 4 of the exhaust gas heat exchangers of FIGS. 1-13. Accordingly, similar components have been given the same reference numbers and only differences between the plate stack 4 of FIG. 14 and the plate stacks 4 of FIGS. 1-13 will be discussed below. The plate stack 4 can be at least partially surrounded by a housing 11, such as the housing 11 illustrated in FIG. 10. Although the illustrated plate stack 4 is configured for use with an exhaust gas heat exchanger that is a parallel flow heat exchanger, counter flow or cross flow configurations can be utilized in some embodiments.

The illustrated plate stack 4 includes a plurality of tubes $2a$, $2b$, $2c$, $2d$, $2e$, $2f$, $2g$, $2h$ and $2i$ and a plurality of fins with only fin $6a$ visible in FIG. 14. The tubes and fins alternate to form the plate stack 4. Tubes $2a$, $2b$, $2c$, $2d$, $2e$, $2f$, $2g$, $2h$, and $2i$ are substantially identical, so only tube $2a$ will be described in detail. Although only the fin $6a$ is shown in FIG. 14, the other fins are substantially identical to the fin $6a$ and the discussion of the fin $6a$ applies to the non-illustrated fins. The fin $6a$ defines ducts 13 which include inlets 14 and outlets 15. The illustrated ducts 13 are non-linear.

The tube $2a$ has a length 63 and a width 64. The fin $6a$ has a length 65 and a width 66. The tube $2a$ includes a first tube portion $2a'$ and a second tube portion $2a''$. The first tube portion $2a'$ extends along a majority of the length 63 of the tube $2a$ and the second tube portion $2a''$ is adjacent the first tube portion $2a'$ and extends along the remainder of the length 63 of the tube $2a$. The fin $6a$ includes a first fin portion $6a'$ and a second fin portion $6a''$. The first fin portion $6a'$ extends along a majority of the length 65 of the fin $6a$ and the second fin portion $6a''$ is adjacent the first fin portion $6a'$ and extends along the remainder of the length 65 of the fin $6a$. The illustrated second portions $2a''$ and $6a''$ can be positioned adjacent an exhaust gas inlet, such as the exhaust gas inlet 54 of FIG. 10. In some embodiments, the length of the second tube portion $2a''$ is between about 10 mm and about 100 mm. In some embodiments, the length of the second tube portion $2a''$ is between about 30 mm and about 100 mm. In some embodiments, the overall length 63 of the tube $2a$ is between about 200 mm and about 750 mm. For example, a ratio of the length of the second tube portion $2a''$ to the overall length 63 can be between about 1:2 and about 1:75. In some embodiments, the ratio of the length of the second tube portion $2a''$ to the overall length 63 is between about 1:2 and about 1:25. In some embodiments, the length of the second fin portion $6a''$ is between about 10 mm and about 100 mm. In some embodiments, the length of the second fin portion $6a''$ is between about 30 mm and about 100 mm. For example, a ratio of the length of the second fin portion $6a''$ to the overall length 65 can be between about 1:2 and about 1:75. In some embodiments, the ratio of the length of the second fin portion $6a''$ to the overall length 65 is between about 1:2 and about 1:25.

Figure 15:
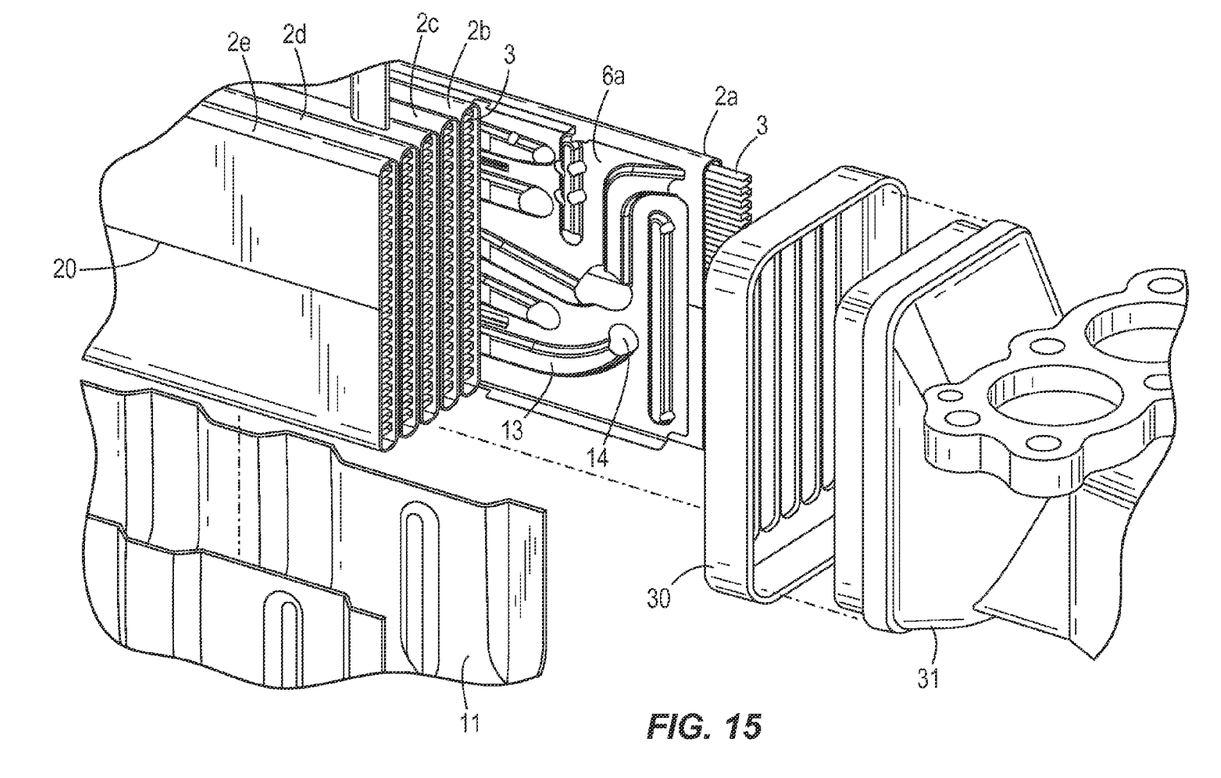
FIG. 15 is a partially exploded view of an exhaust gas heat exchanger according to still another embodiment of the present invention.
Figure 16:
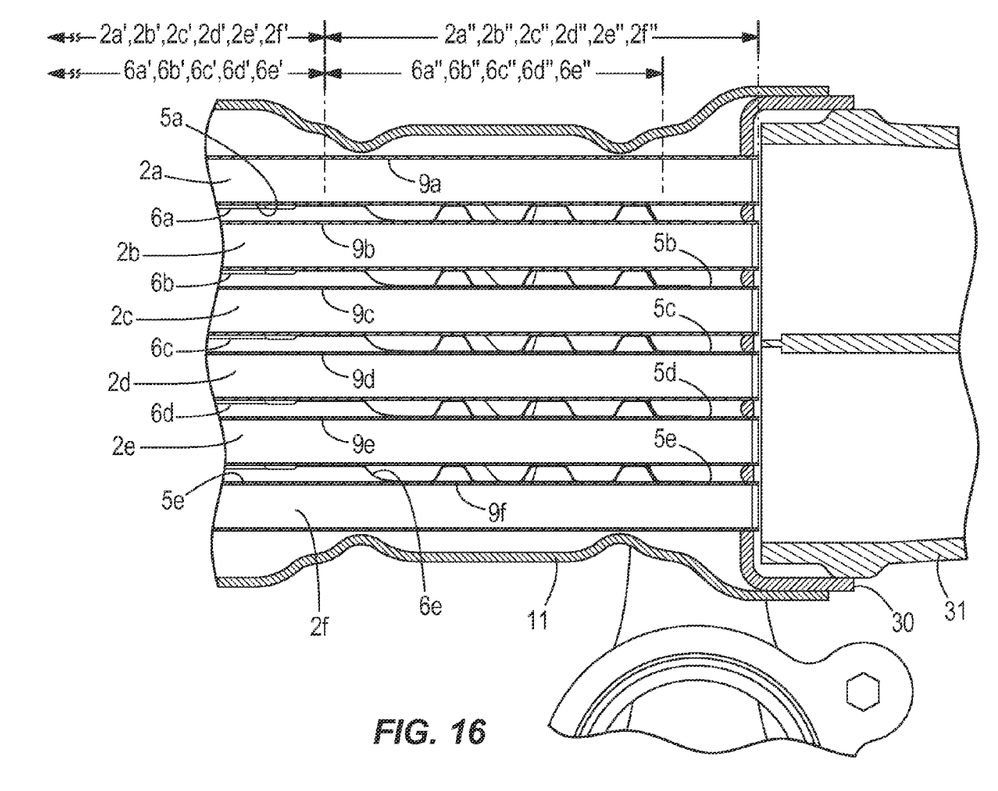
FIG. 16 is a partial longitudinal sectional view taken through the exhaust gas heat exchanger of FIG. 15.
Figure 17:
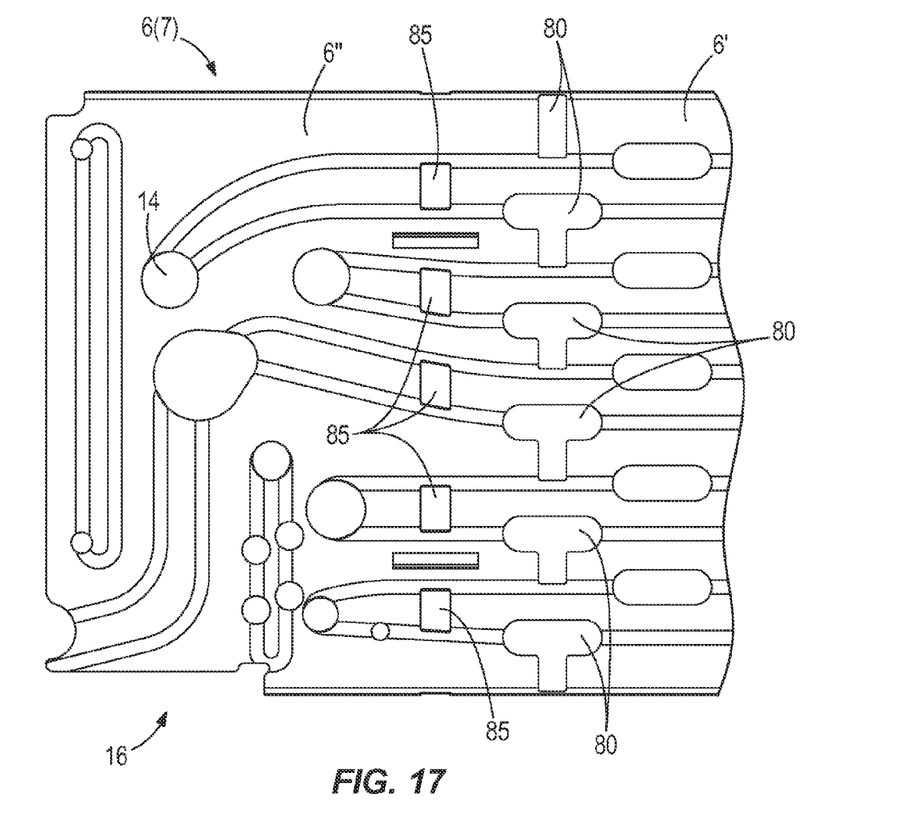
FIG. 17 is a plan view of a portion of a fin according to still another embodiment of the present invention.

FIGS. 15 and 16 illustrate an exhaust gas heat exchanger according to another embodiment. The exhaust gas heat exchanger of FIGS. 15 and 16 includes components and features similar to the exhaust gas heat exchangers of FIGS. 1-14. Accordingly, similar components have been given the same reference numbers and only differences between the exhaust gas heat exchanger of FIGS. 15 and 16 and the exhaust gas heat exchangers of FIGS. 1-14 will be discussed below.

With reference to FIGS. 15 and 16, the exhaust gas heat exchanger includes a plate stack 4 including a plurality of tubes $2a$, $2b$, $2c$, $2d$, $2e$ and $2f$. A first tube $2a$ defines a first exhaust gas flow path $9a$ and a second tube $2b$ defines a second exhaust gas flow path $9b$. The first tube $2a$ and the second tube $2b$ define a first coolant duct $5a$ therebetween that forms a first coolant flow path. A first fin $6a$ is positioned in the first coolant duct $5a$. The illustrated stack 4 includes the tubes $2a$-$2f$ that are formed from sheet metal and each include a seam 20. The tubes $2a$-$2f$ each define an exhaust flow path that includes a turbulator 3 (shown in FIG. 15 but omitted from FIG. 16 for clarity) in the respective exhaust flow path.

The plurality of tubes $2a$-$2f$ of the embodiment of FIGS. 15 and 16 are substantially identical, so only the first tube $2a$ is described in detail. As discussed above with respect to the embodiment of FIG. 14, the first tube $2a$ includes a first tube portion $2a'$ and a second tube portion $2a''$. The plurality of fins $6a$-$6e$ are also substantially identical, so only the first fin $6a$ is described in detail. The first fin $6a$ includes a first fin portion $6a'$ and a second fin portion $6a''$.

The fins $6a$-$6e$ are coupled to the adjacent tubes $2a$-$2f$ by brazing. In some embodiments, a braze foil (for example, AWS BNi-5 nickel-based braze filler metal) is positioned between the stainless steel fins $6a$-$6e$ and the tubes $2a$-$2f$ and is heated until the braze foil melts. Specifically, the first fin $6a$ is brazed to the first tube $2a$ and to the second tube $2b$. Similarly, the second fin $6b$ is brazed to the second tube $2b$ and the third tube $2c$, etc. However, in some embodiments, a portion of some of the fins $6a$-$6e$ is not coupled to the adjacent tubes $2a$-$2f$. For example, the first portion $2a'$ of the tube $2a$ is brazed to the first portion $6a'$ of the fin $6a$, but the second portion $2a''$ of the tube $2a$ is not brazed to the second portion $6a''$ of the fin $6a$. Also, the first portion $2f'$ of the tube $2f$ is brazed to the first portion $6e'$ of the fin $6e$, but the second portion $2f''$ of the tube $2f$ is not brazed to the first portion $6e''$ of the fin $6e$. The portion(s) that are not coupled are permitted to thermally expand independent of one another, which can reduce thermal strains that may be induced due to differences in the rates of thermal expansion. In some embodiments, the first portions $6a'$-$6e'$, respectively, of all of the fins $6a$-$6e$ are coupled to the respective first portions $1a'$-$2f'$ of the adjacent tubes $2a$-$2f$. Specifically, the fin $6a$ is coupled to adjacent tubes $2a$ and $2b$, the fin $6b$ is coupled to adjacent tubes $2b$ and $2c$ and so forth. The fins $6a$-$6e$ that are fixed to the adjacent tubes $2a$-$2f$ move with (e.g. thermally expand and contract) the adjacent tubes 2 with respect to the housing 11.

In some embodiments, all of the second portions 6a"-6e" of the fins 6a-6e are not coupled to the adjacent second portions 2a"-2f" of the tubes 2a-2f. For example, the second portion 6a" of the fin 6a is not coupled to either of adjacent second portions 2a" and 2b" of the tubes 2a and 2b, respectively, the second portion 6b" of the fin 6b is not coupled to either of adjacent second portions 2b" and 2c" of the tubes 2b and 2c, respectively, and so forth. In some embodiments, some of the second fin portions 6a"-6e" are not coupled to some of the adjacent second tube portions 2a"-2f". In such embodiments, some of the second fin portions 6a"-6e" are coupled to some of the adjacent second tube portions 2a"-2f". In some embodiments, the outermost second fin portions 6a" and 6e" are not coupled to the adjacent second tube portions 2a", 2b" and 2e", 2f" because the outermost second fin portions 6a" and 6e" are subject to greater strain than the innermost second fin portions 6b"-6d". For example, the second fin portion 6a" is not coupled to one or both of the adjacent second tube portions 2a" and 2b" and the second fin portion 6e" is not coupled to one or both of the adjacent second tube portions 2e" and 2f". In such an embodiment, the second fin portion 6b" is coupled to one or both of the adjacent second tube portions 2b" and 2c", the third fin portion 6c" is coupled to both of the adjacent second tube portions 2c" and 2d" and the fourth fin portion 6d" is coupled to one or both of the adjacent second tube portions 2d" and 2e". In some embodiments, the outermost fins can include multiple fins on each side and the innermost fins can include multiple fins in the middle. The quantities of outermost and innermost fins are at least partially dependent upon the number of fins used in a particular application. The fins 6 that are not fixed to the adjacent tubes 2 are permitted to move with respect to the adjacent tubes 2.

Various methods and structures are utilized to couple some portions of the fins 6 to the adjacent tubes 2, but to not couple other portions of the fins 6 to the adjacent tubes. In some embodiments, the at least one of the second fin portions 6a"-6e" is unfixed to the adjacent second tube portions 2a"-2f" because the coupling operation (such as brazing) is stopped prior to the coupling operation reaching the second tube portions 2a"-2f". In some embodiments, a braze foil or other material is placed between adjacent ones of the first fin portions 6a'-6e' and first tube portions 2a'-2f, but is not placed between adjacent ones of the second fin portions 6a"-6e" and second tube portions 2a"-2f" during manufacturing. In some embodiments, a braze foil or other material is placed between adjacent ones of the first fin portions 6a'-6e' and/or the first tube portions 2a'-2f and a braze stop material is applied to the second fin portions 6a"-6e" and/or the second tube portions 2a"-2f" to inhibit the braze material from flowing by capillary action from the first fin portions 6a'-6e' onto the second fin portions 6a"-6e" and/or from the first tube portions 2a'-2f onto the second tube portions 2a"-2f".

In the illustrated embodiment, the ducts 13 of the fins 6a-6e have a uniform height along the length of the fins 6a-6e. The height spans substantially the entire distance between the adjacent tubes 2a-2f (see FIGS. 13 and 16). In some embodiments, at least one of the first fin portions 6a'-6e' has a first height and at least one of the second fin portions 6a"-6e" has a second height, which is less than the first height. In these embodiments, the at least one second fin portion 6a"-6e" is spaced from at least one of the adjacent second tube portion(s) 2a"-2f" by an amount that is suitably large so as to inhibit the formation of braze joints between the at least one second fin portion 6a"-6e" and the at least one of the adjacent second tube portion(s) 2a"-2f. By way of example, in some embodiments a gap of approximately 0.005 inches is known to be suitably large to inhibit such formation In some embodiments, such as the embodiment illustrated in FIG. 17, the fins 6 can include first and/or second apertures 80, 85 to inhibit movement via capillary action of coupling material (such as molten braze foil) from the first fin portion 6' and into the second fin portion 6". The fin 6 of FIG. 17 can be interchanged with any of the fins 6 of the embodiments of FIGS. 1-16. In the illustrated embodiment, the first apertures 80 prevent capillary action of the braze foil between the fin 6" and the adjacent tube 2" positioned behind (into the page). In the illustrated embodiment, the second apertures 85 prevent capillary action of the braze foil between the fin 6" and the adjacent tube 2" positioned in front of (out of the page). The illustrated apertures 80, 85 are positioned proximate the coolant inlet and the exhaust gas inlet. In some embodiments, further apertures 80, 85 are positioned proximate the coolant outlet and the exhaust gas outlet. In other embodiments, in addition to or in lieu of apertures, protrusions or other discontinuities can be used to form a barrier to inhibit brazing of the fins 6" to the adjacent tubes 2". Any or all of these manufacturing techniques can be utilized to assure that the first fin portions 6' are coupled to the adjacent first tube portions 2', and that at least one of second fin portions 6" is not coupled to at least one of the adjacent second tube portions 2".

Various features and advantages of the invention are set forth in the following claims.

What is claimed is:

1. An exhaust gas heat exchanger comprising:
 a housing including an exhaust gas inlet, an exhaust gas outlet, a coolant inlet, and a coolant outlet; and
 a stack at least partially surrounded by the housing, the stack including, a first tube defining a first exhaust gas flow path,
 a second tube defining a second exhaust gas flow path,
 a coolant duct between the first tube and the second tube and the coolant duct defining a coolant flow path between the coolant inlet and the coolant outlet, and
 a fin located within the coolant duct between the first tube and the second tube,
 wherein the fin includes a first portion and a second portion defined along a length of the fin measured in a flow direction of the coolant flow path,
 wherein the first tube includes a first portion and a second portion defined along a length of the first tube measured in a flow direction of the first exhaust gas flow path,
 wherein the first portion of the fin is fixed to the first portion of the first tube such that the first portion of the fin is coupled to the first portion of the first tube for movement with respect to the housing, and
 wherein the second portion of the fin is supported in the housing for movement relative to the second portion of the first tube to permit movement of the second portion of the first tube with respect to the second portion of the fin.

2. The exhaust gas heat exchanger of claim 1, wherein the second portion of the fin defines a length of between about 10 mm and about 100 mm.

3. The exhaust gas heat exchanger of claim 2, wherein the second portion of the fin defines a length of between about 30 mm and about 100 mm.

4. The exhaust gas heat exchanger of claim 1, wherein the second portion of the first tube defines a length of between about 10 mm and about 100 mm.

5. The exhaust gas heat exchanger of claim 4, wherein the second portion of the first tube defines a length of between about 30 mm and about 100 mm.

6. The exhaust gas heat exchanger of claim 1, wherein the second tube includes a first portion and a second portion defined along a length of the second tube measured in a flow direction of the second exhaust gas flow path, wherein the first portion of the fin is fixed to the first portion of the second tube such that the first portion of the fin is coupled to the first portion of second tube for movement with respect to the housing, and wherein the second portion of the fin is supported in the housing for movement relative to the second portion of the second tube to permit movement of the second portion of the second tube with respect to the second portion of the fin.

7. The exhaust gas heat exchanger of claim 1, wherein the second portion of the fin is adjacent the exhaust gas inlet.

8. The exhaust gas heat exchanger of claim 1, wherein the fin is an outermost fin.

9. The exhaust gas heat exchanger of claim 1, wherein the fin includes an interruption to separate the first portion of the fin from the second portion of the fin.

10. The exhaust gas heat exchanger of claim 9, wherein the interruption forms a barrier to inhibit flow of a braze material from the first portion of the fin into the second portion of the fin, such that the fin is substantially brazed to the first tube in the first portion of the fin and the fin is substantially not brazed to the first tube in the second portion of the fin.

11. The exhaust gas heat exchanger of claim 1, wherein the fin is brazed to the first tube.

12. The exhaust gas heat exchanger of claim 1, wherein the first portion of the fin has a first height measured normal to the flow direction of the coolant flow path, and the second portion of the fin has a second height measured normal to the flow direction of the coolant flow path that is less than the first height.

* * * * *